S. M. Brooks,

Bird Trap.

No. 102,761.    Patented May 10, 1870.

Witnesses:
Gustave Dietrich
L. S. Mabee

Inventor:
S. M. Brooke
Per Munn & Co.
Attorneys.

United States Patent Office.

SILAS M. BROOKS, OF MEMPHIS, TENNESSEE.

Letters Patent No. 102,761, dated May 10, 1870.

IMPROVED BIRD-TRAP.

The Schedule referred to in these Letters Patent and making part of the same

*To all whom it may concern:*

Be it known that I, SILAS M. BROOKS, of Memphis, in the county of Shelby and State of Tennessee, have invented a new and useful Improvement in Bird-Traps; and I do hereby declare that the following is a full, clear, and exact description thereof, which will enable others skilled in the art to make and use the same, reference being had to the accompanying drawings forming part of this specification.

This invention relates to improvements in traps for birds and small animals; and consists in the application to a small rectangular or other frame adapted for attachment to the ground readily, of a woven netting of any kind and a swinging frame actuated by springs and a setting and tripping device, so arranged that, when set, access is afforded to the birds or animals within the first-named frame, when they trip the swinging frame, which instantly carries the netting over them, and becomes secured by a spring-catch.

The tripping may be effected by the hand of a person concealed or by pulling a long cord, suitably attached.

Similar letters of reference indicate corresponding parts.

A is the rectangular or other suitably-formed frame, of wood or metal, to be secured to the ground by pins or other means.

B is the swinging frame, consisting of a beam and two arms, one near each end, arranged at right angles to the beam.

These arms are pivoted to the center of the frame A, at the end, and they are connected at the said pivoted ends to strong springs, C, which have a constant tendency to swing the said frame B over from left to right.

D is a catch-bar, pivoted at E, and arranged to hold the frame B in the "set" position by passing over the beam and entering a notch in the upper end of the short arm E, rising up from the treadle F, pivoted to the frame A at the inside.

Figure 1:
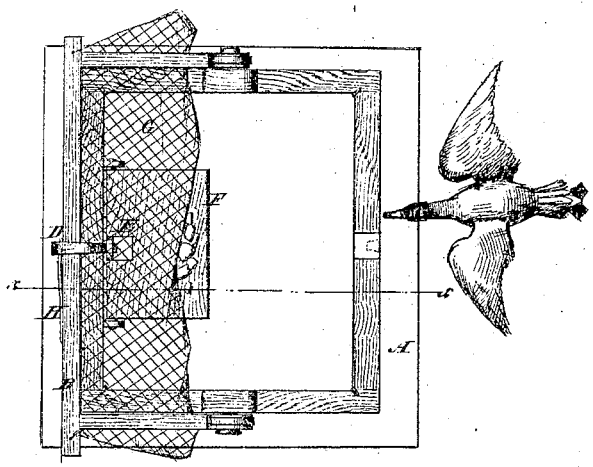
Figure 1 is a plan view of my improved trap, as when set.
Figure 2:
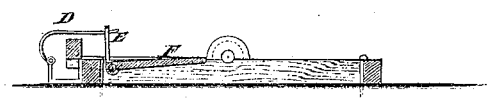
Figure 2 is a transverse section of the same.
Figure 3:
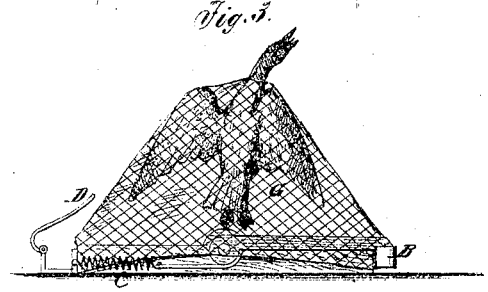
Figure 3 is an end elevation, as when sprung and the game secured.

G is the netting, of cord, wire, or other suitable substance, attached to the frame A at the side where the catch D is, and attached to the beam of the frame B. This netting will be folded back, as shown in fig. 1, when the trap is set, so that the birds or animals may have access to the bait on the treadle, which will be detached from the catch-bar D by the attempts of the game to take the bait, when the springs will throw the frame B and spread the netting over the frame A, as shown in fig. 2.

The beam of the frame B is provided with a spring-catch, H, which engages with the frame A, when the trap is sprung and secures the netting against the efforts of the game to escape.

The treadle may be dispensed with, and the arm E may be detached from the catch-plate D, by hand or by a cord, suitably arranged to be pulled by a person at a distance.

Having thus described my invention,

I claim as new and desire to secure by Letters Patent—

The combination of the frames A B, springs C, netting G, catch-bar D, vibrating arm E, and either the treadle or not, all substantially as specified.

SILAS M. BROOKS.

Witnesses:
R. F. WILLCOX,
C. A. VOSBURGH.